DYNAMIC STORAGE CIRCUIT

Filed April 6, 1953

6 Sheets-Sheet 1

INVENTOR
GENUNG L. CLAPPER
BY John P. Doraty
ATTORNEY

INVENTOR
GENUNG L. CLAPPER
BY John P. Doxity
ATTORNEY

July 30, 1957 G. L. CLAPPER 2,801,334

DYNAMIC STORAGE CIRCUIT

Filed April 6, 1953 6 Sheets-Sheet 3

INVENTOR
GENUNG L. CLAPPER
BY John P. Dority
ATTORNEY

INVENTOR
GENUNG L. CLAPPER
BY John P. Doritz
ATTORNEY

July 30, 1957 G. L. CLAPPER 2,801,334

DYNAMIC STORAGE CIRCUIT

Filed April 6, 1953 6 Sheets-Sheet 5

INVENTOR
GENUNG L. CLAPPER
BY John P. Doritz
ATTORNEY

July 30, 1957 G. L. CLAPPER 2,801,334

DYNAMIC STORAGE CIRCUIT

Filed April 6, 1953 6 Sheets-Sheet 6

INVENTOR
GENUNG L. CLAPPER
BY John P. Sauty
ATTORNEY 2,801,334
Patented July 30, 1957

2,801,334

DYNAMIC STORAGE CIRCUIT

Genung L. Clapper, Vestal, N. Y., assignor to International Business Machines Corporation, New York, N. Y., a corporation of New York Application April 6, 1953, Serial No. 346,938

15 Claims. (Cl. 250—27)

This invention relates to electronic computing machines and more particularly to dynamic storage circuits therefor.

In digital computer applications it is often desirable to convert coded pulse trains appearing serially into coded pulse trains appearing in parallel, or vice versa. It may also be desirable to delay a coded pulse train for a predetermined number of relatively uniform time intervals and it may also be desirable to make readily available the coded pulse trains after each of a number of time intervals or after any given number of time intervals. To accomplish these results a storage or delay device is used.

It is an object of this invention to provide an improved dynamic storage circuit.

Another object of this invention is to provide an improved dynamic storage circuit of relatively compact and inexpensive construction.

Another object of this invention is to provide an improved dynamic storage circuit which can receive a second input pulse while producing an output pulse corresponding to a first input pulse, without interaction therebetween.

A further object of this invention is to provide an improved pulse delay circuit wherein a readily usable output may be had following any of a number of time intervals.

In accordance with the present invention a delay or storage circuit is provided wherein synchronizing pulses are applied to one terminal of the storage circuit at relatively uniformly spaced increments of time while input pulses are applied to another terminal of the storage circuit. A delayed output pulse corresponding to an input pulse is produced by the storage circuit in a subsequent increment of time defined by the synchronizing pulses.

Other objects of the invention will be pointed out in the following description and claims and illustrated in the accompanying drawings, which disclose, by way of examples, the principle of the invention and the best mode, which has been contemplated, of applying that principle.

Figure 1:
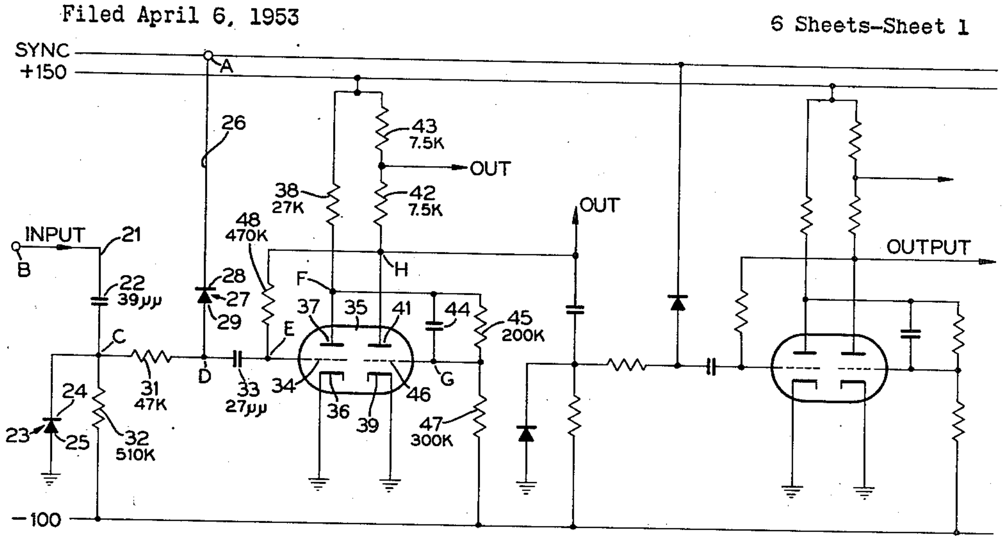
Fig. 1 is a schematic circuit diagram of two dynamic storage units connected together and each made in accordance with the present invention.
Figure 2:
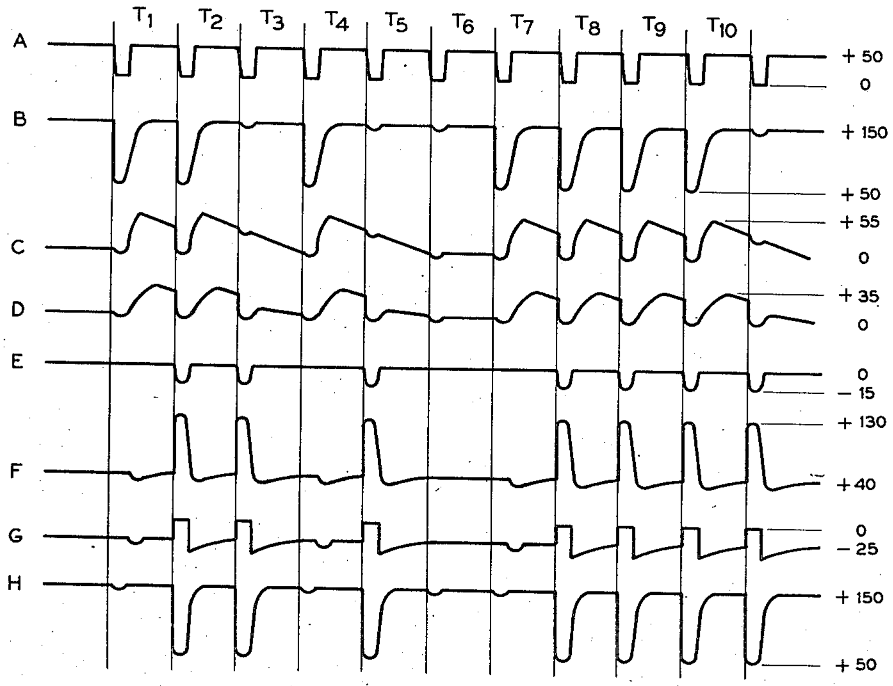
Fig. 2 is a graphical representation, to a common time base, of approximate wave forms which exist in various portions of the circuit of Fig. 1, these portions being designated by the same alphabetic characters as the corresponding wave forms.

Referring to Figs. 1 and 2 of the drawings there are shown in Fig. 1 input terminals A and B, to which are applied respectively synchronizing pulses, shown at A in Fig. 2, and signal pulses, shown at B in Fig. 2. The synchronizing pulses and the signal pulses shown respectively at A and B in Fig. 2 are shown in phase since in practice this is a frequent relation. However, this is not a necessary relation.

The signal pulses are applied over line 21 to one side of an input capacitor 22. The other side of capacitor 22 is connected to ground through a rectifier, shown as a germanium diode 23 having a cathode 24 and an anode 25.

The synchronizing pulses are applied over line 26 to a rectifier, shown as a germanium diode 27 having a cathode 28 and an anode 29. Anode 29 of diode 27 is connected to one side of a resistor 31. The other side of resistor 31 is connected to junction C between capacitor 22 and diode 23. Junction C is also connected to the negative side of a power supply shown as −100 volts through resistor 32. Junction D between diode 27 and resistor 31 is connected to one side of a capacitor 33. The other side of capacitor 33 is connected to the left-hand control electrode 34 of an electron discharge device 35, shown as being of the dual triode type. Left-hand cathode 36 of discharge device 35 is grounded, and left-hand anode 37 of discharge device 35 is connected through a load resistor 38 to the positive side of a power supply shown as +150 volts.

Right-hand cathode 39 of discharge device 35 is grounded, and right-hand anode 41 of discharge device 35 is connected through serially arranged load resistors 42 and 43 to the positive side of the power supply. Junction F between resistor 38 and left-hand anode 37 of discharge device 35 is coupled through condenser 44 and resistor 45 arranged in parallel to the right-hand control electrode 46 of discharge device 35. Junction G between right-hand control electrode 46 and condenser 44 is connected to the negative side of the power supply through resistor 47. Junction H between resistor 42 and right-hand anode 41 of discharge device 35 is connected through a resistor 48 to junction E between capacitor 33 and left-hand control electrode 34 of discharge device 35.

In operation, as a negative-going signal pulse, shown in increment of time T1 at B in Fig. 2, is applied over line 21 to capacitor 22, the charge on capacitor 22 is reduced since junction C is prevented from going but slightly negative by the connection to ground through diode 23. When the signal pulse terminates and line 21 rises, this rise will be transferred by capacitor 22 to junction C, as shown in increment of time T1 at C in Fig. 2. With terminal A, and thus line 26, at the normal positive potential, shown as +50 volts at A in Fig. 2, capacitor 33 will charge through resistor 31 to equalize the potentials at junctions C and D.

During the charge of capacitor 33, junction E is held near ground potential by the left-hand control electrode 34 of discharge device 35. Since control electrode 34 is connected through resistors 48, 42 and 43 to the positive side of the power supply, the left-hand side of discharge device 35 is normally highly conductive giving a diode action between left-hand control electrode 34 and left-hand cathode 36. These elements thus serve as a rectifier between junction E and ground.

Now, with junction D at a potential above ground potential, the leading edge of the synchronizing pulse, shown in increment of time T2 at A in Fig. 2, will cause diode 29 to conduct and lower junction D to ground potential. This drop in potential at junction D will be reflected through capacitor 33 to produce a drop in potential at junction E, shown at E in Fig. 2, and thus initiate a delayed output pulse from the dynamic storage circuit. Capacitor 33 will now discharge through resistors 48, 42 and 43 to raise the potential at junction E and terminate the output pulse, shown in increment of time T2 at E in Fig. 2. The extent of the rise in potential at junction E will be limited by left-hand control electrode 34 of discharge device 35 to approximately ground potential. It is thus seen that an output pulse is produced in the second increment of time T2 corresponding to an input signal pulse in the first increment of time T1.

Also, during the second increment of time T2 a second signal pulse is shown being applied to terminal B and thus to capacitor 22. The leading edge of this signal pulse again reduces the charge on condenser 22, and drops the potential at junction C. As pointed out above, the extent of the drop in potential at junction C is limited to near ground potential by diode 23. Should the leading edge of this signal pulse occur before the leading edge of the synchronizing pulse in increment of time T2, resistor 31 will prevent the leading edge of the signal pulse from being immediately transferred to junction D. As before, when the signal pulse terminates and line 21 rises, the rise of line 21 is transferred by capacitor 22 to junction C, as shown in increment of time T2 at C in Fig. 2. Capacitor 33 will now again charge through resistor 31 to equalize the potentials at junctions C and D. The leading edge of the synchronizing pulse, shown in increment of time T3 at A in Fig. 2, will cause diode 29 to conduct and lower junction D to ground potential. This drop in potential at junction D will be reflected through capacitor 33 to produce a drop in potential at junction E and initiate a second output pulse from the dynamic storage circuit in the third increment of time T3 corresponding to an input pulse in the second increment of time T2. As before this output pulse will be terminated by the discharge of capacitor 33 through resistors 48, 42 and 43.

The leading edge of each of the above-mentioned signal pulses effected a discharge of condenser 22, and the trailing edge of each signal pulse raised junction C in potential to charge condensers 22 and 33. As condenser 33 charged through resistor 31, condenser 22 also charged through this resistor and resistor 32 to equalize the potentials at junctions C and D. The dynamic storage circuit described above incorporates electrostatic storage in that the removal of a static charge placed on capacitor 33 produced a signal indicative of the fact that the charge was there.

No input pulse is shown occurring in the third increment of time T3. Thus capacitor 22 will not be discharged in this increment of time and capacitor 33 will not be charged. By the time the synchronizing pulse occurs in the fourth increment of time, capacitor 22 will be fully charged and capacitor 33 will have no charge stored on it. In this event the synchronizing pulse in the fourth increment of time will not effect a drop in potential at junction E. Thus the absence of an input signal pulse in the third increment of time results in the absence of an output pulse in the fourth increment of time.

From the above it is seen that an input signal pulse appearing at terminal B in a first increment of time will appear at junction E in the second increment of time, and that if no pulse appears at terminal B in a first increment of time no pulse will appear at junction E in the second increment of time. A storage or delay circuit is thus provided wherein an input signal pulse is stored or delayed for an increment of time defined by the interval between two successive synchronizing pulses.

Referring to the wave forms shown at B and E in Fig. 2 it is seen that the delayed pulses at E have been attenuated. In order to obtain delayed output signal pulses of magnitude equal to the input signal pulses an amplifier must be provided.

An amplifier is shown in Fig. 1 including discharge device 35. The pulses shown at E in Fig. 2 are applied to the left-hand control electrode 34 of discharge device 35 and produce at junction F the signals shown at F in Fig. 2. These signals are coupled to junction G by condenser 44 and resistor 45. The signals at junction G, shown at G in Fig. 2, are applied to the right-hand control electrode 46 of discharge device 35 to produce delayed output signal pulses at junction H, shown at H in Fig. 2, of equal magnitude and of the same polarity as the input signal pulses shown at B. Resistor 48 affords a small amount of regenerative feedback from junction H to junction E to more accurately shape the output signal pulses at junction H. A dynamic storage unit is thus provided wherein signal pulses may be stored for an increment of time and thereafter be available in equal magnitude and polarity. The output of this storage unit may be taken from junction H and connected to the input terminal of a second storage unit as shown in Fig. 1. The two storage units may be identical in construction and operation. A second output may be taken from the junction of resistors 42 and 43 for any desired purposes such as to operate other mechanisms in a computing machine.

Referring to Figs. 3 through 8 there are shown in block diagrams examples of some frequently useful applications of the dynamic storage units shown in Fig. 1.

Figure 3:
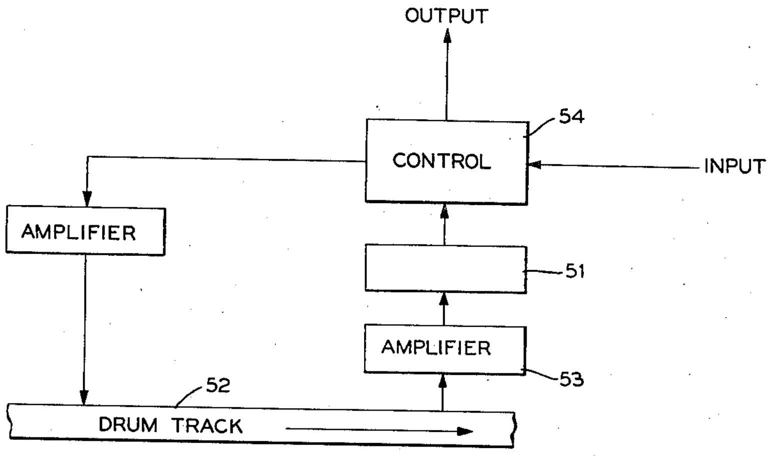
Figs. 3 through 8 are block diagrams showing several examples of useful arrangements of the units shown in Fig. 1.

In Fig. 3 there is shown in block diagram form an example of a storage unit 51 constructed as shown in Fig. 1, incorporated in a magnetic drum revolver circuit. This revolver circuit might include a magnetic drum track 52 with the usual record, read and erase heads, not shown, and associated amplifier and control circuits. By incorporating the storage unit 51 in the revolver circuit, the capacity of the revolver is increased. Signal pulses might be entered into storage unit 51 from an amplifier 53, and the output from the storage unit might be fed to a control circuit 54 in the revolver circuit.

Figure 4:
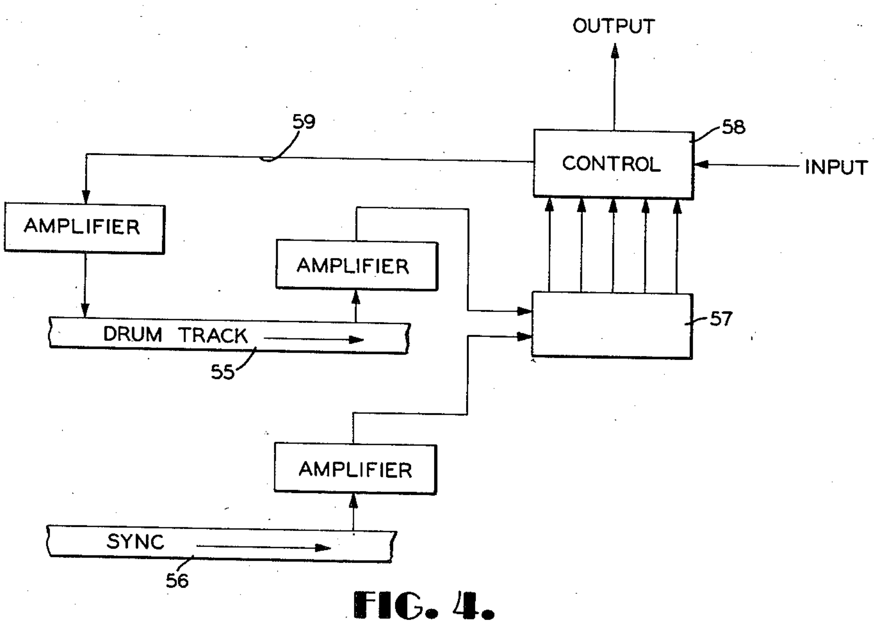
Figure 5:
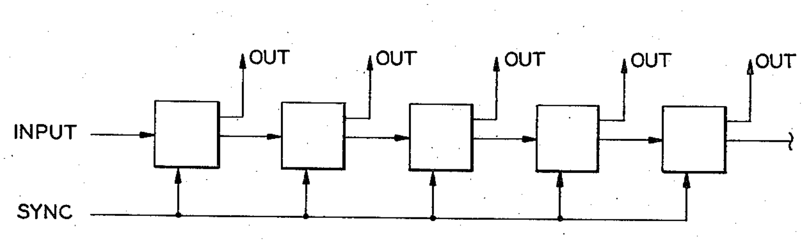

There is shown in block diagram form in Fig. 4 a magnetic drum revolver circuit including track 55 in which information in the form of magnetic spots may be stored. A synchronizing track 56, preferably on the same drum with track 55, may have magnetic spots therein at each area of the track where a spot may occur. Synchronizing pulses may thus be taken from track 56 and fed to a plurality of storage units 57. These storage units may each be constructed as shown in Fig. 1 and connected as shown in block diagram form in Fig. 5. In this example synchronizing pulses in phase with the signal pulses are readily available.

The revolver may include a control circuit 58, constructed as desired to afford a switching arrangement so that the output from any one of the plurality of storage units 57 may be connected to line 59. With such an arrangement a revolver of adjustable length is provided.

Figure 6:
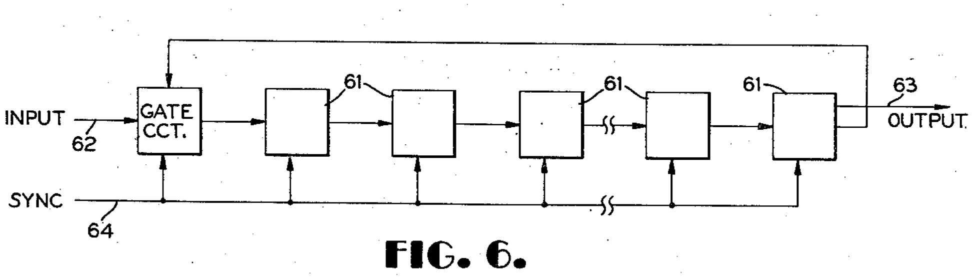

In Fig. 6 there is shown in block diagram form a number of dynamic storage units 61, constructed as shown in Fig. 1, arranged to form a revolver. Information may be entered into this revolver in the form of pulses over line 62, and information may be read from the revolver over line 63. Since the output of each stage of the revolver is identical to the input, as many units as are required may be connected to form a revolver of desired capacity. Synchronizing pulses are applied to each unit from a common line 64. Each unit will delay or store a pulse for one increment of time and the total time that a pulse will be delayed from the time it enters the revolver on line 62 until it emerges on line 63 will be a number of increments of time equal in number to the number of storage units, or a multiple thereof.

Figure 7:
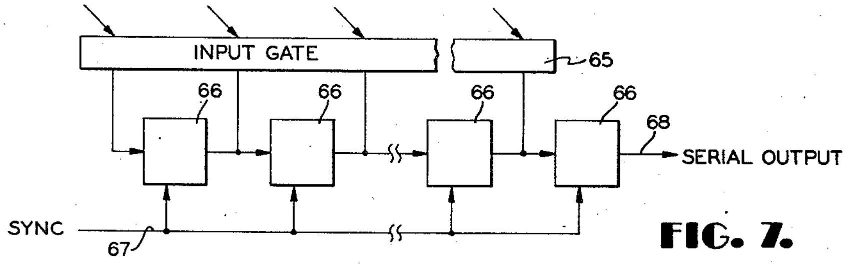

Fig. 7 shows in block diagram form a circuit for converting a train of pulses appearing in parallel to a train of pulses appearing serially. The train of pulses appearing in parallel may be applied from an input gate 65 to the input terminals of a series of dynamic storage units 66, each constructed as shown in Fig. 1. These storage units may receive synchronizing pulses from a common line 67, and the serial output may be taken over line 68.

Figure 8:
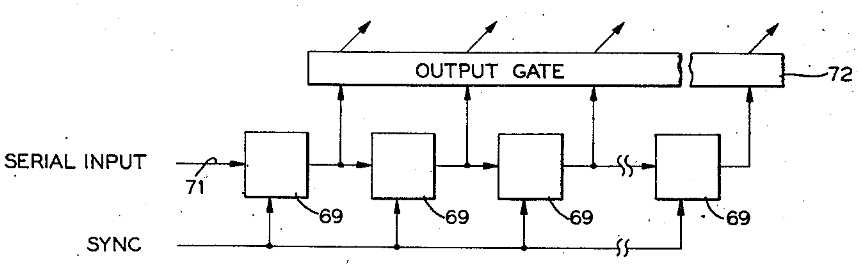

A circuit, in block diagram form, for converting a train of serially appearing pulses to a train of pulses appearing in parallel is shown in Fig. 8. The train of serially appearing pulses may be applied to the input terminal of one of a number of dynamic storage units 69, constructed as shown in Fig. 1, over line 71. The parallel output may be taken through an output gate 72 from either of the outputs shown in the storage unit of Fig. 1. Line 73 may supply synchronizing pulses to each of the storage units 69.

Figure 9:
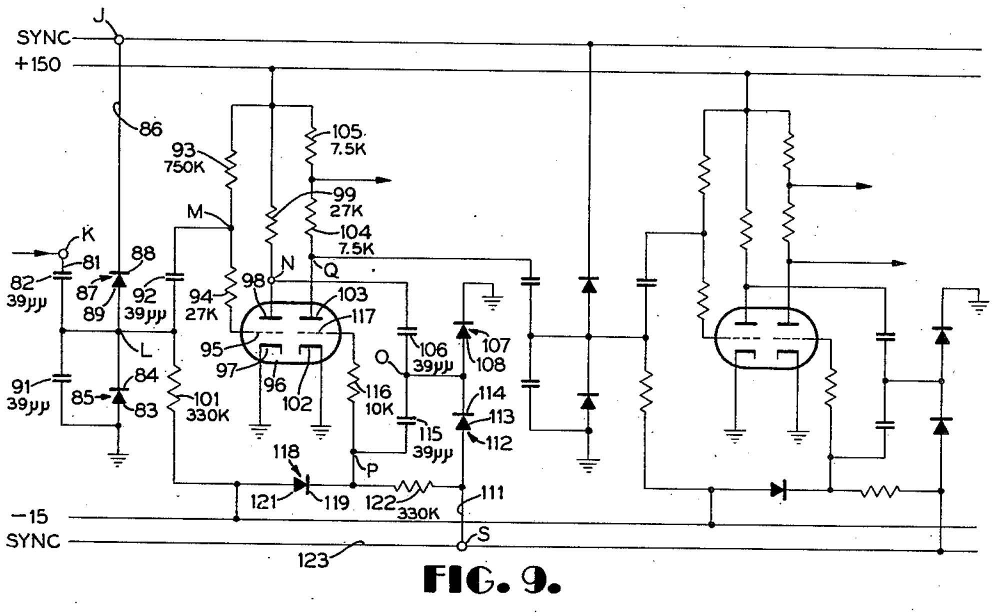
Fig. 9 is a schematic circuit diagram of a modification of the circuit shown in Fig. 1.
Figure 10:
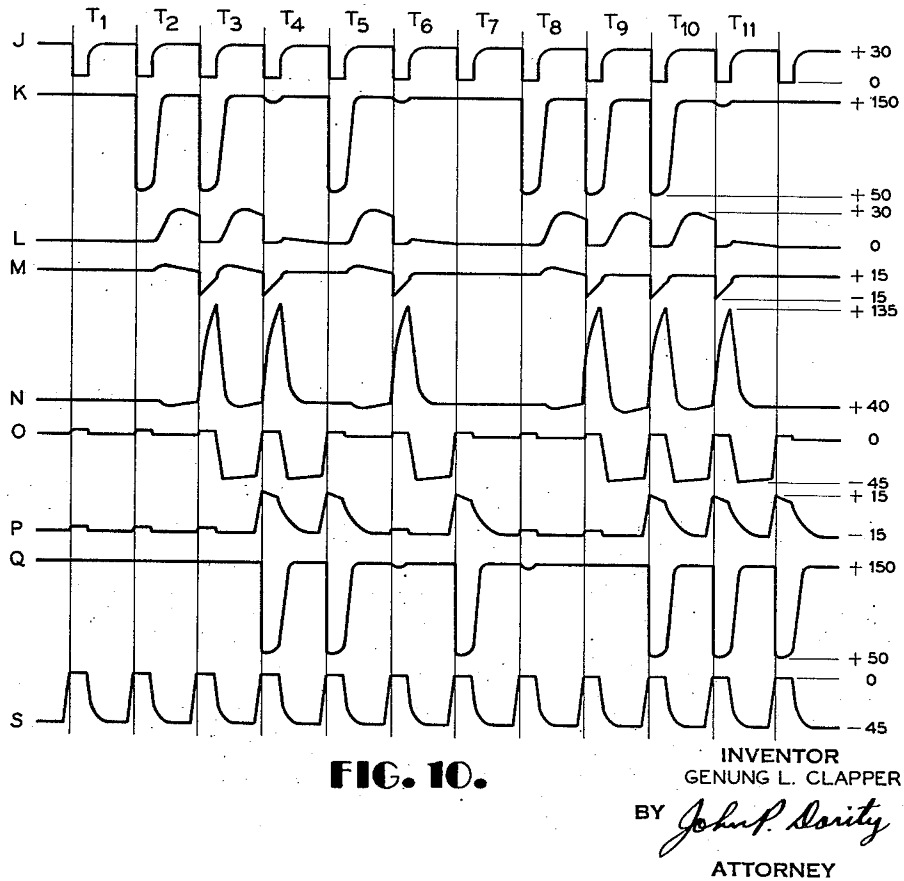
Fig. 10 is a graphical representation, to a common time base, of approximate wave forms which exist in various portions of the circuit of Fig. 9, these portions being designated by the same alphabetic characters as the corresponding wave forms.

Referring to Figs. 9 and 10 there are shown in Fig. 9 input terminals J, K and S, to which are applied respectively negative-going synchronizing pulses, shown at J in Fig. 10, signal pulses, shown at K in Fig. 10, and positive-going synchronizing pulses, shown at S in Fig. 10.

The signal pulses are applied over line 81 to one side of an input capacitor 82. The other side of capacitor 82 is connected to ground through a rectifier, shown as a germanium diode 83 having a cathode 84 and an anode 85.

The negative-going synchronizing pulses are applied over line 86 to a rectifier, shown as a germanium diode 87 having a cathode 88 and an anode 89. Anode 89 of diode 87 is connected to junction L between capacitor 82 and diode 83. Junction L is also connected to ground through a condenser 91, and to one side of a capacitor 92. The other side of capacitor 92 is connected to the positive side of a power supply, shown as +150 volts, through a resistor 93. Junction M between resistor 93 and capacitor 92 is connected through a resistor 94 to the left-hand control electrode 95 of an electron discharge device 96, shown as being of the dual triode type. Left-hand cathode 97 of discharge device 96 is grounded, and left-hand anode 98 of discharge device 96 is connected through a load resistor 99 to the positive side of the power supply. Junction L is also connected through a resistor 101 to the negative side of a power supply shown as −15 volts.

Right-hand cathode 102 of discharge device 96 is grounded, and right-hand anode 103 of discharge device 96 is connected through serially arranged load resistors 104 and 105 to the positive side of the power supply.

Junction, or input terminal, N between resistor 99 and left-hand anode 98 of discharge device 96 is connected to one side of a capacitor 106. The other side of capacitor 106 is connected to ground through a rectifier, shown as a germanium diode 107 having an anode 108 and a cathode 109.

The positive-going synchronizing pulses are applied over line 111 to a rectifier, shown as a germanium diode 112 having an anode 113 and a cathode 114. Cathode 114 of diode 112 is connected to junction O between capacitor 106 and diode 107. Junction O is also connected to one side of a capacitor 115. The other side of capacitor 115 is connected through a resistor 116 to the right-hand control electrode 117 of discharge device 96. Junction P between resistor 116 and capacitor 115 is connected to the negative side of the power supply through a rectifier, shown as a germanium diode 118 having a cathode 119 and an anode 121. Junction P is also connected through a biasing resistor 122 to the anode 113 of diode 112. Synchronizing pulse line 123 serves as a source of voltage for biasing resistor 122.

In operation, junction L between capacitor 82 and diode 83 is normally held near ground potential by diode 83. The negative side of the power supply tends to pull junction L negative through resistor 101 but if cathode 84 of diode 83 goes negative with respect to grounded anode 85, diode 83 conducts and maintains junction L near ground potential. Junction M between capacitor 92 and resistor 93 is normally held at only a few volts positive potential by left-hand control electrode 95 of discharge device 96. Since control electrode 95 is connected through resistors 94 and 93 to the positive side of the power supply, the left-hand side of discharge device 96 is normally highly conductive giving a diode action between left-hand control electrode 95 and left-hand cathode 97. These elements thus serve as a rectifier between resistor 94 and ground.

In the first increment of time, T1 in Fig. 10, there is no input pulse applied to terminal K. The negative-going synchronizing pulse, shown in increment of time T1 at J in Fig. 10, will not produce any appreciable effect at junction L since this pulse goes from +30 volts to zero volts and junction L is standing at or near zero potential. Thus the negative-going synchronizing pulse in the first increment of time will produce no change in potential at junction M.

Junction O between capacitor 106 and diode 107 is normally held near ground potential by diode 107. If junction O should tend to go positive with respect to ground diode 107 would conduct to main junction O near ground potential. Junction P between capacitor 115 and resistor 116 is normally held at the −15 volt level by diode 118. Line 111, normally at −45 volts as shown at S in Fig. 10, tends to pull junction P negatively toward −45 volts but diode 118 conducts to hold junction P near the −15 volt level of the power supply.

As pointed out above, in the first increment of time T1 no signal is produced at junction M and therefore no signal will be produced at junction N between resistor 99 and left-hand anode 98 of discharge device 96. Thus no signal will be applied to capacitor 106 during the first increment of time T1. The positive-going synchronizing pulse, shown in increment of time T1 at S in Fig. 10, will not produce any appreciable effect at junction O since this pulse goes from −45 volts to zero volts, and junction O is standing at or near zero volts potential. Thus the positive-going synchronizing pulse in the first increment of time will produce no change in potential at junction P.

During the second increment of time a negative-going input signal pulse, shown in the second increment of time T2 at K in Fig. 10, is applied to terminal K. The leading edge of this pulse discharges capacitor 82 since junction L is prevented from going negative by diode 83. As before, the negative-going synchronizing pulse, shown in the second increment of time T2 at J in Fig. 10, produces no appreciable effect at junction L since junction L is at or near zero potential. The trailing edge of the signal pulse occurring during the second increment of time raises line 81 to the normal +150 volt level. This rise in potential is reflected across capacitor 82 to the junction L.

Because of the diode action between left-hand control electrode 95 and left-hand cathode 97 of discharge device 96, junction M rises but slightly in potential. Capacitor 92 is thus charged during the second increment of time, as shown at L in Fig. 10.

Since the left-hand side of discharge device 96 was conducting near the point of saturation, a slight rise in potential at junction M would produce no appreciable change in potential at junction N. With no signal pulse applied to capacitor 106 from junction N during the second increment of time, as pointed out above, the positive-going synchronizing pulse applied to terminal S during the second increment of time T2, shown at S in Fig. 10, will effect no change in potential at junction O or at junction P.

Now, with junction L at a potential above ground potential, the leading edge of the negative-going synchronizing pulse, shown in increment of time T3 at J in Fig. 10, will cause diode 87 to conduct and lower junction L to ground potential. This drop in potential at junction L will be reflected through capacitor 92 to produce a drop in potential at junction M, shown at M in Fig. 10, and thus initiate an output pulse from the dynamic storage circuit. Capacitor 92 will now discharge through resistor 93 to raise the potential at junction M and terminate the output pulse, shown in increment of time T3 at M in Fig. 10. The extent of the rise in potential at junction M will be limited by left-hand control electrode 95 of discharge device 96 to a few volts above ground potential. It is thus seen that an output pulse is produced in the third increment of time corresponding to an input signal pulse in the second increment of time.

The attenuated negative-going output pulse at junction M in the third increment of time, shown at M in Fig. 10, is applied to left-hand control electrode 95 of discharge device 96 to produce an amplified positive-going pulse at junction N, shown in the third increment of time T3 at N in Fig. 10. This positive-going pulse is applied as an input pulse to one side of capacitor 106. The other side of capacitor 106 at junction O is prevented from going positive by diode 107. Thus capacitor 106 is charged by the positive-going input pulse at junction N. As pointed out above, with junction O held at ground potential, a positive-going synchronizing pulse, shown in the third increment of time T3 at S in Fig. 10, will have no appreciable effect on the potential at junction O or junction P. The trailing edge of the positive-going pulse at junction N in the third increment of time will be reflected across capacitor 106 to lower junction O in potential. Junction P will be maintained at approximately −15 volts by diode 118. Thus capacitor 115 is charged by the trailing edge of the positive-going pulse occurring at junction N during the third increment of time. The positive-going synchronizing pulse occurring in the fourth increment of time T4, shown at S in Fig. 10, will cause diode 112 to conduct and return junction O to ground potential. This rise in potential at junction O will be reflected across capacitor 115 and raise the potential at junction P to initiate an output pulse at junction P. Capacitor 115 will discharge through resistor 122 to lower the potential at junction P and terminate the positive-going output pulse at junction P, shown in the fourth increment of time T4 at P in Fig. 10. The extent of the drop in potential at junction P will be limited to approximately −15 volts by diode 118. It is thus seen that a positive-going output pulse is produced at junction P in the fourth increment of time corresponding to a positive-going input signal pulse from junction N in the third increment of time.

The positive-going output pulse at junction P in the fourth increment of time is applied to right-hand control electrode 117 of discharge device 96 through resistor 116. This positive-going pulse produces an amplified negative-going pulse at junction Q, shown in the fourth increment of time T4 at Q in Fig. 10, between right-hand anode 103 of discharge device 96 and resistor 104. This amplified negative-going pulse at junction Q occurs one increment of time following a positive-going pulse at junction N, or two increments of time following a negative-going input signal pulse appearing at terminal K.

From the above it may be seen that a negative-going input signal pulse appearing at terminal K in a first increment of time will appear at junction M in a second increment of time, and that if no pulse appears at terminal K in a first increment of time no pulse will appear at junction M in the second increment of time. It is also seen that a positive-going signal pulse appearing at junction N in a first increment of time will appear at junction P in a second increment of time, and that if no pulse appears at junction N in a first increment of time no pulse will appear at junction P in the second increment of time. Storage or delay circuits are thus provided wherein an input signal pulse is stored or delayed for an increment of time defined by the interval between two successive synchronizing pulses.

With the storage circuits arranged as shown in Fig. 9 it is seen that a dynamic storage unit is provided wherein an input signal pulse is stored or delayed for two increments of time and thereafter made available equal in magnitude and polarity to the input signal pulse. The output from the junction Q, shown at Q in Fig. 10, may be applied to the input terminal of a second dynamic storage unit as shown in Fig. 9, or to any other desired structure. The second dynamic storage unit shown in Fig. 9 may be identical in construction and operation to the first dynamic storage unit.

Figure 11:
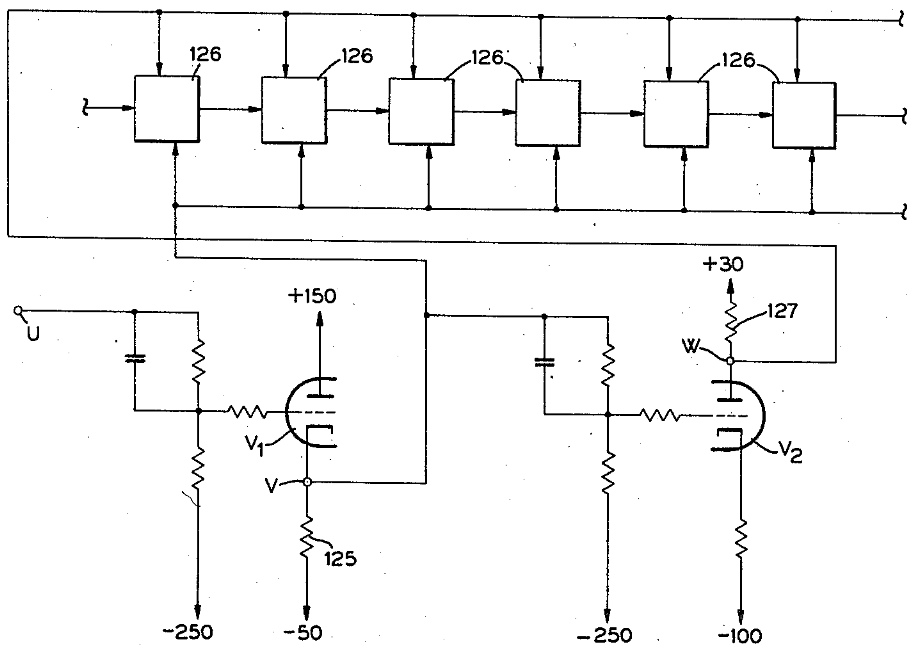
Fig. 11 is a schematic circuit diagram, partly in block form, of a number of the units shown in Fig. 9 with one arrangement of synchronizing pulse input circuits incorportated therewith.
Figure 12:
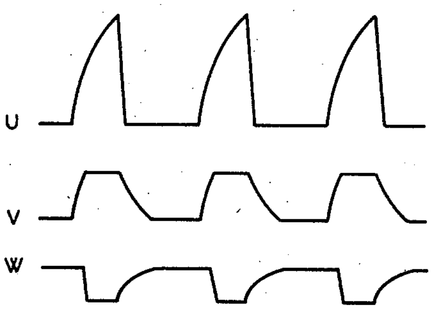
Fig. 12 is a graphical representation, to a common time base, of approximate wave forms which exist in various portions of the circuit of Fig. 11, these portions being designated by the same alphabetic characters as the corresponding wave forms.

Referring to Fig. 11 there is shown a schematic circuit diagram of one arrangement of synchronizing pulse input circuits incorporated with a number of the dynamic storage units constructed as shown in Fig. 9, the storage units being shown in block diagram form. In Fig. 11 there is shown an input terminal U, to which are applied positive-going pulses, shown at U in Fig. 12. These positive pulses are applied to a cathode follower type amplifier including vacuum tube V1, and resistor 125. The output of the cathode follower shown at V in Fig. 12, is taken from terminal V and applied as the positive-going synchronizing pulses to a number of storage units 126, each constructed as shown in Fig. 9. The output from terminal V is also applied to a plate driver circuit including vacuum tube V2 and resistor 127. The output of the plate driver, shown at W in Fig. 12, is taken from terminal W and applied as the negative-going synchronizing pulses to the several storage units 126. Positive and negative synchronizing pulses are thus provided in proper phase relationship.

Figure 13:
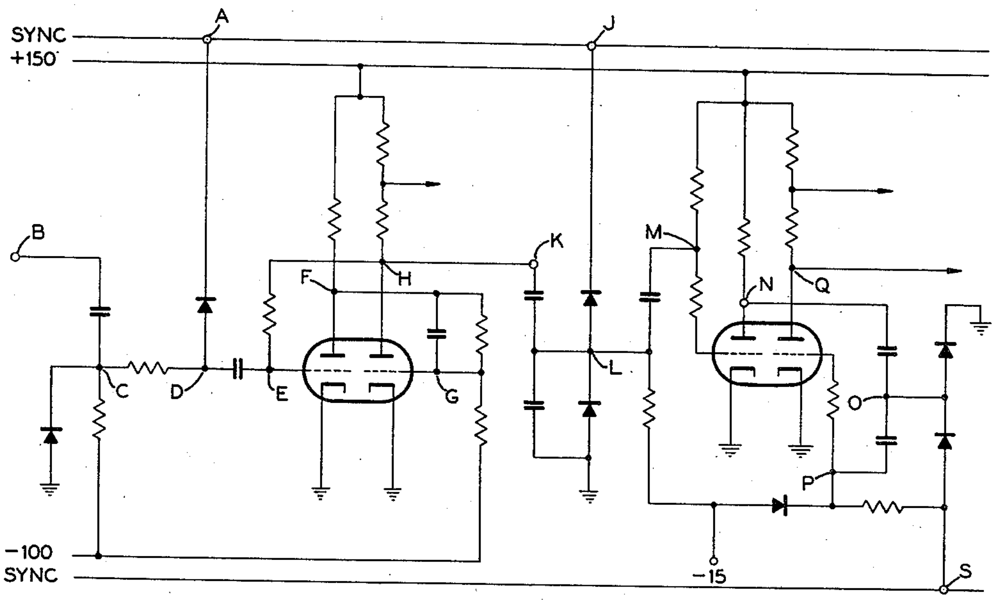
Fig. 13 is a schematic circuit diagram of a storage unit as shown in Fig. 9 incorporated with a unit as shown in Fig. 1.
Figure 14:
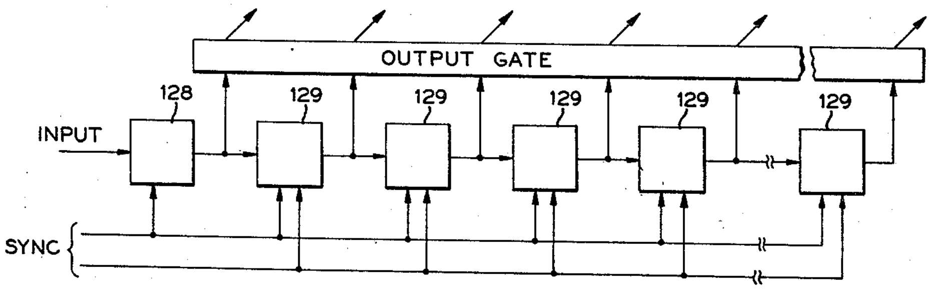
Fig. 14 is a block diagram showing an example of a dynamic storage circuit incorporating the units of Figs. 1 and 9.

Referring to Figs. 13 and 14 there is shown a dynamic storage unit constructed as shown in Fig. 1 connected to provide input signals to a dynamic storage unit constructed as shown in Fig. 9. In Fig. 14, unit 128 is shown arranged to provide a delay of a single increment of time, and each unit 129 is shown arranged to provide a delay of two increments of time. With this arrangement, pulses delayed for odd numbers of increments of time are readily available with the use of a minimum number of components.

Although examples of potential levels and values of the several circuit components are indicated in the drawings and description to illustrate the invention, it is to be understood that they are only by way of example and that changes therein to fit individual requirements do not constitute departures from the inventive concept.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A dynamic storage circuit comprising the combination of: first and second input terminals; a source of voltage; a first rectifier and a biasing resistor arranged in series and connected across said source of voltage; first and second capacitors connected in series between said second input terminal and a point intermediate said biasing resistor and said first rectifier; a second rectifier connected between said first input terminal and the junction of said first and said second capacitors; a third rectifier connected in series with said second rectifier and a connection between the junction of said second and said third rectifiers and the junction of said first and said second capacitors.

2. A dynamic storage circuit comprising the combination of: first and second input terminals; a source of voltage; a first rectifier and a biasing resistor connected in series across said source of voltage; first and second capacitors connected in series between said second input terminal and the junction of said biasing resistor and said first rectifier; a second rectifier connected between said first input terminal and the junction of said first and said second capacitors; a third rectifier connected in series with said second rectifier; a connection between the junction of said second and said third rectifiers and the junction of said first and said second capacitors; and an output circuit connected to the junction of said first rectifier and said biasing resistor.

3. In a dynamic storage circuit wherein synchronizing pulses are applied to a first terminal and signal pulses are applied to a second terminal: the combination of a first rectifier; first and second capacitors arranged in series and connected between said second terminal and said first rectifier; second and third rectifiers arranged in series and connected at one end to said first terminal; means for connecting a point intermediate said second and said third rectifiers to a point intermediate said first and said second capacitors; and a biasing resistor connected at the junction of said first rectifier with said first and said second capacitors.

4. In a dynamic storage circuit wherein synchronizing pulses are applied to a first input terminal and signal pulses are applied to a second input terminal: the combination of a source of voltage; a first rectifier and a biasing resistor connected in series across said source of voltage; first and second capacitors connected in series between said second input terminal and the junction of said biasing resistor and said first rectifier; a second rectifier connected between said first input terminal and to the junction of said first capacitor and said second capacitor; and a third rectifier connected between the junction of said first and said second capacitors and a point on said source of voltage.

5. A dynamic storage circuit comprising the combination of: first and second input terminals; a first rectifier, first and second capacitors arranged in series and connected between said second input terminal and said first rectifier; a second rectifier connected between said first input terminal and a point intermediate said first and said second capacitors; a third rectifier connected in series with said second rectifier; a connection between the junction of said second and said third rectifiers and the junction of said first and said second capacitors; and a biasing resistor connecting said second input terminal and the junction of said first rectifier with said first and said second capacitors.

6. A dynamic storage circuit comprising the combination of: first and second input terminals; a source of voltage; a first rectifier and a biasing resistor connected in series across said source of voltage; a second rectifier and a first capacitor connected in series between said first input terminal and the junction of said biasing resistor and said first rectifier, said second rectifier being connected to said first input terminal; a second capacitor and a third rectifier connected in series between said second input terminal and a point on said source of voltage, said second capacitor being connected to said second input terminal; and an impedance connected between the junction of said second capacitor and said third rectifier and the junction of said first capacitor and said second rectifier.

7. A dynamic storage circuit comprising the combination of: first and second input terminals; a source of voltage; a first rectifier and a biasing resistor arranged in series and connected across said source of voltage, said first rectifier being arranged to offer minimum impedance to current flow from said resistor; second and third rectifiers connected in series between said first input terminal and a point on said source of voltage and arranged to offer minimum impedance to current flow toward said first input terminal; a first capacitor connected between a point intermediate said first rectifier and said biasing resistor and a point intermediate said second and said third rectifiers; and a second capacitor connected between said second input terminal and a point intermediate said second and said third rectifiers.

8. A dynamic storage circuit comprising the combination of: first and second input terminals; a source of voltage; a first rectifier and a biasing resistor arranged in series and connected across said source of voltage, said first rectifier being arranged to offer minimum impedance to current flow toward said resistor; second and third rectifiers arranged in series and connected at one end to said first input terminal, said second and said third rectifiers being arranged to offer minimum impedance to current flow from said first input terminal; a first capacitor connected between a point intermediate said first rectifier and said biasing resistor and a point intermediate said second and said third rectifiers; and a second capacitor connected between said second input terminal and a point intermediate said second and said third rectifiers.

9. In a dynamic storage circuit wherein synchronizing pulses are applied to a first terminal and signal pulses are applied to a second terminal: the combination of first and second rectifiers arranged in series and connected at one end to said first terminal; a first capacitor between said second terminal and a point intermediate said first and said second rectifiers; an electron discharge device having a control electrode, a cathode and an output circuit; a second capacitor connected between a point intermediate said first and said second rectifiers and said control electrode; and a biasing resistor associated with said control electrode.

10. In a dynamic storage circuit wherein synchronizing pulses are applied to a first terminal and signal pulses are applied to a second terminal: the combination of an electron discharge device serving conjointly as a rectifier and an amplifier and having a control electrode, a cathode and an output circuit; first and second rectifiers arranged in series and connected between said first terminal and said cathode; first and second capacitors arranged serially and connected between said second terminal and said control electrode; a connection between a point intermediate said first and said second rectifiers and a point intermediate said first and said second capacitors; and a biasing resistor connected to said control electrode.

11. In a dynamic storage circuit wherein synchronizing pulses are applied to a first terminal and signal pulses are applied to a second terminal: the combination of an electron discharge device having a control electrode, a cathode and an output circuit; first and second rectifiers connected in series between said first terminal and said cathode and arranged to offer minimum impedance to current flow toward said first terminal; first and second capacitors connected in series between said second terminal and said control electrode; a connection between a point intermediate said first and said second rectifiers and a point intermediate said first and said second capacitors; a biasing resistor connected to said control electrode; and an inverter circuit connected to said output circuit.

12. In a dynamic storage circuit wherein synchronizing pulses are applied to a first terminal and signal pulses are applied to a second terminal: the combination of an amplifier including an electron discharge device having a control electrode, a cathode and an output circuit; first and second rectifiers connected in series between said first terminal and said cathode and arranged to offer minimum impedance to current flow toward said cathode; first and second capacitors connected in series between said second terminal and said control electrode; a connection between a point intermediate said first and said second rectifiers and a point intermediate said first and said second capacitors; a source of voltage; a third rectifier and a resistor connected in series across said source of voltage, said third rectifier being arranged to offer minimum impedance to current flow toward said resistor; and a connection between said control electrode and the junction of said resistor and said third rectifier.

13. In a dynamic storage circuit wherein synchronizing pulses of opposite polarity are applied to first and second terminals and signal pulses are applied to a third terminal: the combination of first and second rectifiers arranged in series and connected at one end to said first terminal; a first biasing resistor and a third rectifier arranged in series; first and second capacitors connected in series between said third terminal and a point intermediate said first biasing resistor and said third rectifier; a connection between the junction of said first and said second capacitors and the junction of said first and said second rectifiers; an inverter circuit having an input connected to a point intermediate said first biasing resistor and said third rectifier and an output; fifth and sixth rectifiers arranged in series and connected at one end to said second terminal; a second biasing resistor and a sixth rectifier arranged in parallel; third and fourth capacitors connected in series between the output of said inverter circuit and a point intermediate said second biasing resistor and said sixth rectifier; a connection between the junction of said fourth and said fifth rectifiers and the junction of said third and fourth capacitors; and an output circuit from a point intermediate said second biasing resistor and said sixth rectifier.

14. A dynamic storage circuit comprising the combination of: first, second, and third input terminals; means for applying synchronizing pulses of opposite polarity to said first and said second input terminals; means for applying signal pulses to said third input terminal; an electron discharge device having a control electrode, a cathode and an anode circuit; first and second rectifiers connected in series between said first terminal and said cathode and arranged to offer minimum impedance to current flow toward said first terminal; first and second capacitors connected in series between said third terminal and said control electrode; a connection between the junction of said first and said second rectifiers and the junction of said first and said second capacitors; a first biasing resistor connected to said control electrode; third and fourth rectifiers connected in series between said second terminal and said cathode and arranged to offer minimum impedance to current flow toward said cathode; a fifth rectifier having a cathode; a second biasing resistor connected between said second terminal and the cathode of said fifth rectifier; third and fourth capacitors connected between said anode circuit and the cathode of said fifth rectifier; a connection between the junction of said third and said fourth rectifiers and the junction of said third and said fourth capacitors; and an output circuit connected to the cathode of said fifth rectifier.

15. A dynamic storage circuit as defined in claim 7 wherein said first rectifier consists of the control electrode and cathode of an electron discharge device.

References Cited in the file of this patent

UNITED STATES PATENTS

| | | |
|---|---|---|
| 2,078,792 | Fitzgerald | Apr. 27, 1937 |
| 2,102,371 | Miller | Dec. 14, 1937 |
| 2,195,996 | Palmer | Apr. 2, 1940 |
| 2,579,473 | Chatterjea | Dec. 25, 1951 |
| 2,644,887 | Wolfe | July 7, 1953 |
| 2,653,187 | Lucke et al. | Sept. 22, 1953 |